United States Patent [19]

Crockett et al.

[11] Patent Number: 4,829,563
[45] Date of Patent: May 9, 1989

[54] METHOD FOR PREDICTIVE DIALING

[75] Inventors: Gary B. Crockett, Richardson; Jocelyn J. Torres-Ball; Arthur J. Olender, both of Dallas, all of Tex.

[73] Assignee: Teknekron Infoswitch Corporation, Ft. Worth, Tex.

[21] Appl. No.: 178,548

[22] Filed: Apr. 7, 1988

[51] Int. Cl.⁴ .............................................. H04Q 3/64
[52] U.S. Cl. ..................................... 379/309; 379/247
[58] Field of Search .......................... 379/309, 265, 247

[56] References Cited

U.S. PATENT DOCUMENTS

| | | | |
|---|---|---|---|
| 3,733,440 | 5/1973 | Sipes | 379/70 |
| 3,899,645 | 8/1975 | Brafman | 379/355 |
| 3,987,252 | 10/1976 | Vicari | 379/214 |
| 3,989,899 | 11/1976 | Norwich | 379/134 |
| 4,160,124 | 7/1979 | Law | 379/357 |
| 4,188,510 | 2/1980 | Bower et al. | 379/359 |
| 4,210,783 | 7/1980 | Vicari et al. | 379/214 |
| 4,256,928 | 3/1981 | Lesea et al. | 379/214 |
| 4,408,100 | 10/1983 | Pritz et al. | 379/309 X |
| 4,438,296 | 3/1984 | Smith | 379/69 |
| 4,497,979 | 2/1985 | Phelan | 379/309 X |
| 4,599,493 | 7/1986 | Cave | 379/309 X |

Primary Examiner—James L. Dwyer
Attorney, Agent, or Firm—David H. Judson

[57] ABSTRACT

The present invention describes a method and apparatus for predictive dialing in a multi-operator telephone system which improves the productivity of operators while simultaneously reduces customer "unattended" calls. These objectives are achieved by generating a prediction of the number of operators expected to be available at the end of a predetermined time interval in the future, as well as a prediction of the number of calls expected to be successfully completed during that time interval. The predicted number of calls is then weighted by an "weighting" factor which is controlled by variations in the percentage of unattended calls and variations in the average operator idle-time between calls. The system dynamically adjusts the number of calls dialed based on short term comparisons of the weighted predicted number of calls versus the predicted number of operators, and based on periodic adjustment of the weighting factor.

12 Claims, 2 Drawing Sheets

METHOD FOR PREDICTIVE DIALING

TECHNICAL FIELD

The present invention relates generally to automated dialing in multi-operator telephone systems and more particularly to techniques for improving the productivity of operators in such systems while simultaneously reducing the number of calls which are answered by prospects with no operators currently available to handle such calls.

BACKGROUND OF THE INVENTION

Automated dialing techniques for multi-operator telephone systems are well-known in the prior art. Such systems typically include a control circuit for automatically establishing telephone connections through a plurality of telephone lines and for providing dialing of telephone calls to prospects over such lines. When a call is successfully made, a non-busy operator is selected and the operator is connected to the called line. The operator's time is therefore not consumed with the dialing of telephone numbers and the resulting time loss associated with busy and unanswered lines. One such system is shown in U.S. Pat. No. 4,599,493 to Cave.

Multi-line telephone control systems such as shown in the Cave patent seek to maximize operator utilization by establishing a predetermined dialing rate and then adjusting this rate according to a number of factors. For example, the system increases the dialing rate (by increasing the number of lines or by reducing the pause between outgoing calls) if there are a number of available operators. Alternatively, the system decreases the dialing rate (by pausing between calls or by stopping calls on a line) if the number of customers who are being placed on hold for an operator becomes excessive. However, because these schemes adjust dialing rate as opposed to the number of calls currently in progress, they cannot react promptly to short-term deviations from average performance. Such schemes thus produce both more unattended calls and operator down-time than desired.

There is therefore a need for an improved method and apparatus for automated dialing in a multi-operator telephone system which overcomes these and other problems associated with prior art techniques.

BRIEF SUMMARY OF THE INVENTION

It is an object of the present invention to provide improved automated dialing techniques for multi-operator telephone systems.

It is yet another object of the invention to provide a multi-operator telephone system having increased productivity over prior art systems.

it is a still further object of the invention to provide a predictive dialing routine for a multi-operator telephone system which improves the productivity of operators in the system while simultaneously reducing customer "unattended" calls. An "unattended" call is a call dialed by the system and answered by a prospect, but with no operator free to handle the call.

These and other objects of the invention are achieved by a noval method and apparatus for providing a continuous sequence of completed telephone calls to a plurality of operators in a multi-operator telephone system. In the preferred embodiment, the method includes the steps of: predicting the number of operators expected to be available to handle a call completion at the end of a predetermined time interval, predicting the number of calls expected to be answered during the predetermined time interval, multiplying the predicted number of calls by a predetermined "weighting" factor to generate a weighted number of calls expected to be answered during the predetermined time interval, determining whether the weighted number of calls is less than the predicted number of operators expected to be available to handle a call completion and, if so, dialing another call. The routine continues to dial calls until the weighted number of calls is equal to the predicted number of operators expected to be available to handle a call completion.

According to the invention, the predicted number of operators expected to be available to handle a call completion is based generally on the number of currently-available operators plus a predetermined percentage of those operators currently handling a call completion. The predicted number of calls expected to be answered is based on the number of calls currently outstanding (i.e., calls dialed but not yet answered or found to be busy) multiplied by a historical percentage of calls that have been answered. In the preferred embodiment, the weighting factor is controlled by variations in the percentage of unattended calls and variations in an average operator idle-time between calls. Preferably, the weighting factor is dynamically-adjusted on a relatively lone-term basis (e.g., every 100 calls) while the predictive portion of the method operates on every call transition.

BRIEF DESCRIPTION OF THE DRAWINGS

For a more complete understanding of the present invention and the advantages thereof, reference is now made to the following Description taken in conjunction with the accompanying drawings in which.

DETAILED DESCRIPTION

Figure 1:
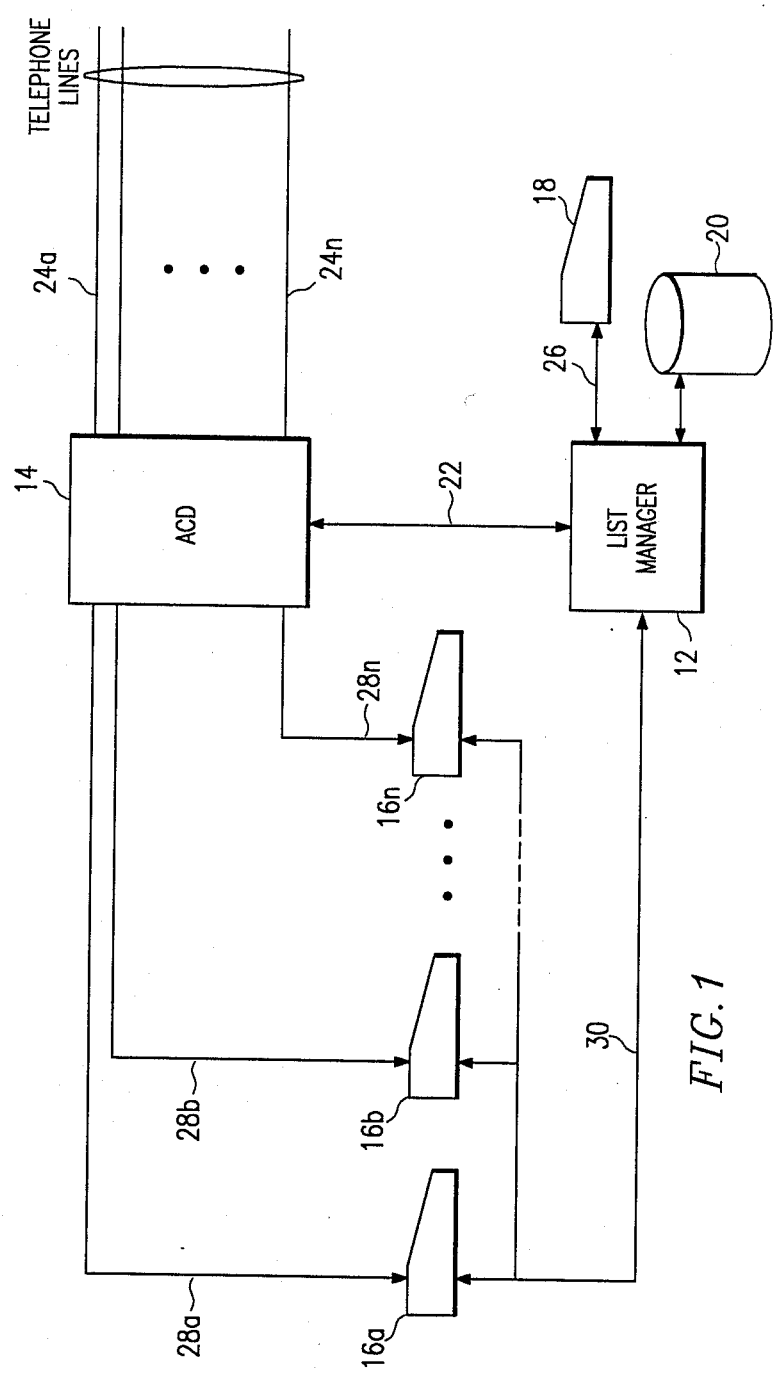
FIG. 1 is a block diagram of a multi-line telephone system.

FIG. 1 is a simplified block diagram illustrating a multi-line telephone system 10 for use in carrying out the predictive dialing routine of the present invention. As used herein, the term "predictive dialing" refers to the setting up of outgoing calls in anticipation of the availability of operators to handle such calls. The predictive dialing routine of the present invention has two major objectives: maximizing the productive time of the operators (by letting the operators spend their time talking to prospects instead of dialing calls, listening to telephone rings or making busy numbers for recall) and minimizing unattended calls to call prospects. An "unattended" call is a call dialed by the system and answered by a prospect, but with no operator free to handle the call. When an unattended call occurs, the system has to disconnect, put the call on hold, or play an announcement.

The multi-line telephone system 10 includes a list manager 12, an automatic call distributor 14, a plurality of operator workstations 16a–16n and a supervisory control terminal 18. The list manager 12 is preferably a minicomputer which contains appropriate storage capability for supporting the predictive dialing routine to be described in more detail below. The list manager also includes a database 20 for storing a list of prospects organized into specific calling compaigns or projects. The automatic call distributor 14 or "ACD" communicates with the list manager 12 via a serial bus 22 and include appropriate circuitry for outdialing calls over a plurality of telephone lines 24a–24n. The system 10 includes more telephone lines 24 than operator workstations 16. The ACD 14 also includes the necessary hardware and software for automatically detecting answer, busy or special intercept tones on the outgoing calls, or, alternatively, for timing-out and reporting a "no answer" condition on a call. Each of the operator workstations 16 preferably includes a video display terminal, a keyboard and a suitable control circuit for controlling communications between the workstation and the ACD via one of the lines 28a–28n. The workstations 16 are controlled by the list manager 12 via control signals provided over a plurality of serial links designated generally by the reference numeral 30. Each workstation 16 also includes a headset (not shown) for use by the workstation operator to facilitate bidirectional audio communication between the operator and the called party following call completion. Finally, the supervisory control terminal 18 is also preferably a video display terminal controlled by the list manager 12 via bus 26. The supervisory control terminal 18 provides displays of project status and includes a suitable keyboard for enabling entry of appropriate administrative commands to control system operation as will be described below.

The system 10 shown in FIG. 1 serves to automatically make telephone connections between the workstations and the telephone lines 24. In particular, when ACD 14 successfully completes a call (i.e., when there is an answer detection condition), a next available operator is selected by the ACD and connected to the called line. The predictive dialing routine of the invention functions generally to insure that a maximum number of operators remain busy at all times and that unattended calls are minimized. This operation is achieved by the routine shown in FIG. 2.

Generally, the predictive dialing routine operates to generate both a prediction of the number of operators expected to be available at the end of a predetermined time interval (e.g., 10 seconds) in the future, and a prediction of the number of calls expected to be successfully completed during this time interval. The predicted number of calls is then weighted by an "weighting" factor which is automatically controlled by variations in the percentage of unattended calls and by variations in the average operator idle-time between calls. Preferably, an acceptable percentage of unattended calls and an average idle-time between calls are preselected by a system supervisor via commands entered into the supervisory control terminal 18. As will described in more detail below, the predictive dialing routine dynamically adjusts the number of outgoing calls dialed based on short term comparisons of the weighted predicted number of calls versus the predicted number of operators, and based on periodic adjustment of the weighting factor.

Figure 2:
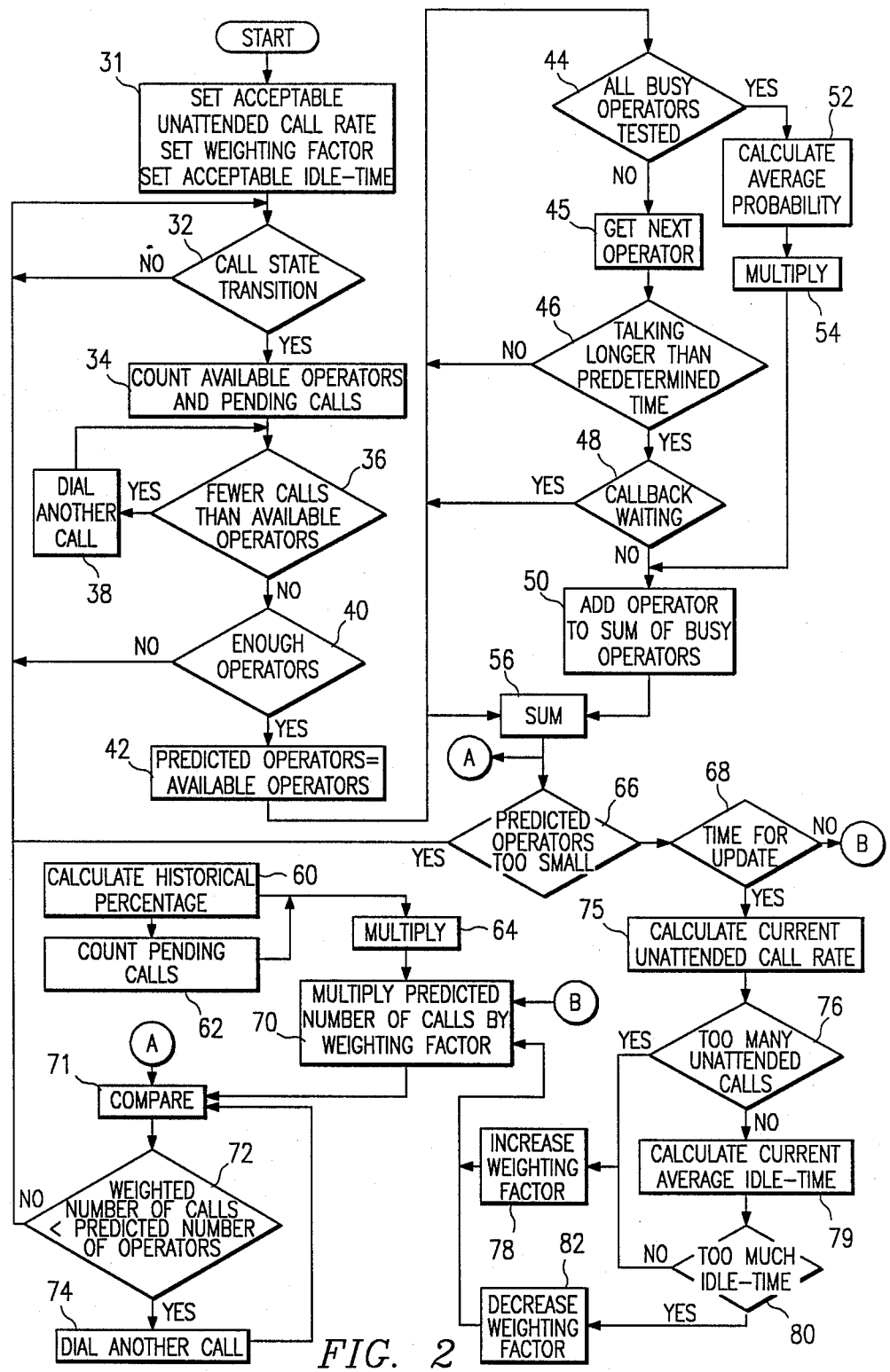
FIG. 2 is a functional flowchart diagram describing the predictive dialing routine of the present invention for use in maximizing productivity of the operators in the system of FIG. 1.

Referring now specifically to FIG. 2, the predictive dialing routine begins at step 31 wherein the supervisor preselects an acceptable percentage of unattended calls and an acceptable average idle-time between calls. For example, at step 31 the supervisor could enter appropriate commands at supervisory control terminal 18 to reflect that the acceptable percentage of unattended calls should be less than 2% and the average idle-time between calls should be 10 seconds. As also shown in FIG. 2, at step 31 the system sets the "weighting" factor equal to an arbitrary value (preferably at the midpoint of possible values for the factor). Step 31 may be performed at any time (usually at the beginning of a project cycle).

Referring back to FIG. 2, the predictive dialing routine then performs a test at step 32 to detect a call state transition. Preferably, the routine is entered on every call state transition. If the outcome of the test at step 32 is negative, the routine cycles back to step 32. If a call state transition has occurred, the routine proceeds to step 34 to count the number of available operators as well as the number of currently pending calls (i.e., calls which have been dialed but not yet answered or found to be busy). A test is then made at step 36 to determine if the number of currently pending calls is less than the number of available operators. If so, the routine dials another call at step 38 and then returns to step 36. This "demand" dialing subroutine (steps 34, 36 and 38) generally insures that the number of available operators remains small. If the number of pending calls is greater than or equal to the number of available operators, the routine continues at step 40. In particular, a test is made at step 40 to determine whether there are enough operators available to carry out a "dial-ahead" subroutine according to the invention. The minimum number of available operators for the dial-ahead subroutine is preferably a supervisor-selected variable; alternatively, step 40 can be omitted entirely. If the outcome of the test at step 40 is negative, the routine terminates until the next call state transition. However, if the result of the test at step 40 is positive, the routine continues with the dial-ahead subroutine.

As described generally above, the method of the present inention predicts (a) the number of operators expected to be available at the end of a predetermined time interval in the future, and (b) the number of calls expected to be answered during this time interval. The "dial-ahead" subroutine preferably performs these predictions for every call state transition (if the outcome of step 40 is positive). According to the present invention, the prediction of the number of operators expected to be available at the end of the predetermined time interval is generally based on the number of currently available operators plus a predetermined percentage of the them currently busy operators. In the preferred embodiment, the predetermined percentage is set equal to the average probability that an operator will finish a call in the predetermined time interval. This operation is shown in detail in FIG. 2.

In particular, the subroutine continues at step 42 by setting the number of predicted operators equal to the number of currently available operators. The subroutine must then look at each one of the currently busy operators so that the predetermined percentage of such operators can be generated and added to the number of currently available operators. Preferably, not all of the currently busy operators are included to calculate the predetermined percentage. In particular, at step 44 a test is made to determine if all operators currently handling a call completion (i.e., all busy operators) have been tested. If not, the routine selects the next such operator and performs a test at step 46 to determine if that operator has been talking for longer than a predetermined time (e.g., 15 seconds). If the operator has been talking for longer than the predetermined time, another inquiry is performed at step 48 to determine if that operator has a specific callback waiting (i.e., a previously called prospect who is scheduled to receive a callback at this particular prearranged time). If the outcome of either the test at step 46 is negative or the test at step 48 is positive, by convention the operator is not counted as one of the operators currently handling a call completion. If the outcome of step 46 is positive and the outcome of step 48 is negative, the operator is added at step 50 to a running total of currently busy operators. While the screening operation of steps 46 and 48 is preferred, either step 46 or step 48 may be omitted; alternatively, both steps 46 and 48 can be omitted, in which case the predetermined percentage of currently busy operators would be derived from the entire universe of such operators.

If the outcome of the test at step 44 is positive, all of the currently busy operators have been screened and therefore the subroutine can then update the prediction of the number of operators expected to be available at the end of the predetermined time interval. In particular, at step 52 a calculation is made of an average probability that an operator will finish a call in the predetermined time interval. Preferably, step 52 is a continuous calculation which is performed in the list manager 12. At step 54, the calculated average probability is multiplied by the number of currently busy operators who have been qualified by steps 46 and 48. The result generated is then added at step 56 to the number of currently available operators (originally set at step 42) to form the prediction of the number of operators expected to be available at the end of the predetermined time interval.

As noted above, the method also generates a prediction of the number of calls expected to be completed during the predetermined time interval. This prediction is also performed by the dial-ahead subroutine. In particular, at step 60 the subroutine generates a calculation of an historical percentage of the number of calls which have been completed over a predetermined period (e.g., over the last two (2) hours). The historical percentage may or may not include unattended calls. Preferably, step 60 is a continuous calculation also performed by the list manager 12. At step 62, the subroutine determines the number of calls currently pending, i.e., calls dialed but not yet answered or found busy. The number of currently pending calls is then multiplied at step 64 by the historical percentage of answered calls. Step 64 generates the prediction of the number of calls expected to be answered during the predetermined time interval.

The subroutine now has the necessary data to perform the "dial-ahead" calculation. Before this calculation is carried out, however, the subroutine performs a test at step 66 to determine if the number of predicted operators is less than a predetermined number. If so, the subroutine terminates until the next call state transition. Step 66 may be omitted if desired. At step 68, another test is made to determine whether it is time to update the "weighting" factor preset at step 31. As described generally above, the "weighting" factor is preferably changed as a function of variations in the percentage of unattended calls and variations of the average idle-time between calls for the operators (i.e., the period between the time at which an operator hangs up with one call and the time at which a subsequent call completion is provided to that operator). In the preferred embodiment, the test at step 68 is performed over a relatively long-term basis (e.g., every 100 calls dialed).

If the outcome of the test at step 68 is negative, the subroutine can then perform the dial-ahead. More specifically, at step 70 the predicted number of calls (generated at step 64) is processed by the weighting factor. In the preferred embodiment, such processing is a simple multiplication step. As noted above, the weighting factor is preset by the system at step 31. Step 70 generates a "weighted" number of calls expected to be completed during the predetermined time interval. The weighted predicted number of calls is then compared with the predicted number of operators at step 71. At step 72, a test is made to determine whether the weighted number of calls is less than the predicted number of operators expected to be available to handle a call completion at the end of the time interval. If so, the subroutine dials another call at step 74 and then cycles back to step 71. Steps 71, 72 and 74 are repeated until the weighted number of calls expected to be completed in the predetermined time interval is equal to the predicted number of operators expected to be available to handle a call completion at the end of the predetermined interval.

The dial-ahead subroutine described above provides significant improvements over prior art automated dialing techniques by continuously monitoring operator and unattended call activity in the system and then dynamically adjusting outgoing call initiations. The short-term comparison of the predicted number of operators versus the "weighted" predicted number of calls advantageously provides increased system response and thus decreased operator down-time. Such improvements are further enhanced by adjusting the weighting factor on a relatively periodic basis as discussed below.

With reference back to FIG. 2, if the outcome of the test at step 68 is positive, the subroutine enters an adjustment phase of operation. At step 75, a calculation is made of the current percentage of unattended calls. At step 76, a test is made to determine whether the acceptable percentage of unattended calls has been exceeded. As noted above, an acceptable percentage of such calls is preset by the supervisor, via the supervisory control terminal, at step 31. If the outcome of the test at step 76 is positive, the weighting factor is increased at step 78 and the routine returns to step 70 as previously described. If the outcome of the test at step 76 is negative, the subroutine calculates the current idle-time between calls at step 79 and performs a second test at step 80 to determine whether the acceptable idle-time between calls (which has also been preset at step 31) has been exceeded. If the calculated idle-time between calls is greater than the acceptable idle-time, the weighting factor is decreased at step 82 and the subroutine returns to step 70 as previously described. If the calculated idle-time between calls is less than the acceptable idle-time, the weighting factor is increased at step 78 and the subroutine returns to step 70.

Although the preferred embodiment of the predictive dialing routine is shown in detail in FIG. 2, those skilled in the art will appreciate that numerous modifications can be provided to this routine. For example, it is possible to perform the "operator" and "call" predictions in parallel as opposed to sequentially, and one or the other of the tests 76 and 80 may be omitted if desired. Alternatively, the routine can update the weighting factor with "unattended call" variations on one pass and then "idle-time" variations on the next pass, and so forth. Moreover, steps 52 and/or 60 may be performed irrespective of a call state transition even though such steps are shown incorporated into the routine of FIG. 2.

The predictive dialing routine of FIG. 2 can be implemented with the source code listings shown below. As noted above, this routine (Copyright 1988, Teknekron Infoswtich Corporation) is supported in suitable memory associated with the list manager 12 of FIG. 1.

```
#ifndef lint
static char Sccsid[] = "@(#)call_handle:predict.c      1.17";
#endif
/*
 * NAME:       predict
 *
 * PURPOSE:    Handle project demand dialing and dial-ahead.
 *
 * ALGORITHM:  First count the currently available agents and
 *             make sure there is a call being dialed on behalf of
 *             each.  Then project the number of agents to be
 *             free 10 seconds from now, project how many calls
 *             will be answered in that interval, and make the
 *             two numbers match.
 *
 * RETURNS:    PREDICT_OK   - normal case
 *             PREDICT_LOW  - low on calls but not enough to log agn's off
 *             PREDICT_DEAD - completely out of calls in the group
 *             PREDICT_OUT  - low enough to logout the agm requesting a call
 *
 */ include       "call_buf.h"
include       "sys_data.h"
#include       "tmagstatus.h"
#include       "call_handl.h"
#include       "identify.h"

/* FUNCTION DECLARATION (leave this line here) */
predict(cgp_idx,cgp)
int cgp_idx;       /* call group index */
register Callgroup *cgp;
{
        register int i;
        int avail = 0;            /* number of agents ready for a call */
        int connected = 0;        /* number of agents connected now */
        long tbuf;                /* storage for time() return */
        int sec;                  /* number of seconds connected per agent */
        int percent;              /* percentage of calls answered */
        register Agent_status *ap;    /* pointer to SHM agent structure */
        int calls;                /* number of calls expected to be answered */ tmerror (CHP, 5, 0,
            "predict() entering cgp_idx %d", cgp_idx);

/*
         * Go through the chain of agents in the call group to count
         * how many are currently connected or available.  Compare this
         * to the number of outstanding calls for the call group, and
         * set up more calls as needed.
         */ for(ap = cgp->achain; ap != 0; ap = ap->next) {
                if(ap->pdstate == READY || ap->pdstate == CONNECT)
                        if(ap->ncback == 0)

avail++;
} tmerror (CHP, 10, 0,
    "predict(): %d agents avail, num out calls: %d",
        avail, cgp->ncall);

while(cgp->ncall < avail) {
    tmerror (CHP, 6, 0,
        "setting up demand call: ncall %d avail %d",
        cgp->ncall, avail);
    if(setup_call(cgp_idx, cgp) == 0) {
        if (cgp_dead (cgp) == 0) {
            tmerror (CHP, 1, 0,
            "predict(): Sending agent failure for cgp %d",
            cgp_idx);
            fail_agents (cgp);
            return(PREDICT_DEAD);
```

```
                }
                else if (cgp->runningout && req_outstanding(cgp) == 0) {
                        return(PREDICT_OUT);
                }
                else {
                        return(PREDICT_LOW);
                }
        }
}

/* Return if no dial-ahead is to be done */
if(cgp->nagent < cgp->pdmin)
        return(PREDICT_OK);

tmerror (CHP, 2, 0,
    "predict() checking for dial-ahead");

/*
 * Project the number of agents that will be available
 * 10 seconds from now.  Empirical data shows that the
 * probability of a talking agent being free in 10 seconds
 * is nearly independent of the talk time so far.
 */ time(&tbuf);
for(ap = cgp->achain; ap != 0; ap = ap->next) {
        if(ap->pdstate == READY && ap->ncback == 0)
                avail += 100;
        if(ap->pdstate == CONNECT) {
                connected++;
                sec = tbuf - ap->pdtime;
                if(sec >= 15 && ap->ncback == 0)
                        avail += 20;
        }
}
avail /= 100;
tmerror(CHP, 6, 0, "avail %d\n", avail);

/*
         * Project the number of calls that will be answered in the
         * next 10 seconds by counting the number of calls
         * currently outstanding and multiplying by the percentage
         * of calls that are answered.  If we expect fewer calls than
         * expected available agents, set up more calls.
         * If fewer than 4 agents are projected available, forget it;
         * the numbers are too unstable.
         */ if(avail >= 4) for(i=0; i < 2; i++) { percent = (cgp->answered * 100) /
                                (cgp->answered + cgp->busy + cgp->noans);
                if(percent < 30)
                        percent = 30;   /* don't go too hog wild */
                calls = ((cgp->ncall - connected) * percent + 50) / 100;

/* see if speed needs adjusting */
                adjustspeed(cgp_idx, cgp);

/* if demand dialing, break out of loop */
                if (cgp->pdspeed == SLOWSPEED) {
                        tmerror(CHP, 5, 0, "demand dialing in loop, cgp_idx = %d
                        break;
                } calls = (calls * cgp->pdspeed) / 100;
                tmerror (CHP, 5, 0,
                    "predict(): pdspeed = %d ncalls=%d percent=%d calls=%d avail
                    cgp->pdspeed, cgp->ncall, percent, calls, avail);
                if(calls < avail) {
                        setup_call(cgp_idx, cgp);
                }
        } tmerror (CHP, 5, 0, "predict() exiting");
        return(PREDICT_OK);
}
/* check whether there are any requests outstanding to the dbh for any
 * projects in this callgroup.
```

```
*/
static req_outstanding(cgp)
register Callgroup *cgp;
{
int i;
extern CH_project Project[];

for (i = 0; i < cgp->nproj; i++) {
                if ((Project[cgp->pindex[i]]).requested)
                        return(1);
        }
        return(0);
} ifndef lint
static char Sccsid[] = "@(#)call_handle:adjustspeed.c    1.9";
endif define FTHROTTLE       1
define S1THROTTLE      5
#define S2THROTTLE      1

/*.
 * NAME:        adjustspeed
 *
 * PURPOSE:     Called to check and adjust, if necessary, the aggressiveness
 *              of the dial-ahead rate.
 *
 * ALGORITHM:   Adjust speed only every NC calls dialed.
 *              If we've reached the max % of abandoned/answered.
 *                      slow down speed
 *                      reset counters
 *                      return
 *              Get the average wait time between calls
 *              If calculated average > desired average
 *                      If max % abandoned/answered is close to specified
 *                              do not change speed
 *                              reset counters
 *                              return
 *                      else
 *                              increase speed
 *              Else
 *                      If calculated average < desired average
 *                              slow down
 *              Reset counters
 *              return
 *
 * RETURNS:     none
 *
 * NOTES:
 *
.*/ include         <stdio.h>
include         <IPC.h>
#include         "sys_data.h"
#include         "prefetch.h"
#include         "call_buf.h"
#include         "messages.h"
#include         "identify.h"
#include         "call_handl.h"
#include         "iss.h"

extern int K1, K2, NC;
extern double F;
extern FILE *chp_fd;
extern int Trace;
extern int N;
extern int Bucket_ptr[16];
extern int speedchgflg[16];

/* FUNCTION DECLARATION (leave this line here) */
void
adjustspeed( cgp_idx, cgp )
int cgp_idx;
register Callgroup *cgp;
{
```

```
int     speedchg;
int     calcavg;            /* calculated average wait time */
int     cur_abandans;       /* current % of abandoned/answered calls */
int     stat;               /* return status */
long    tot_answered = 0L;  /* total answered calls */
long    tot_ready = 0L;     /* total ready time */
long    tot_abandisc = 0L;  /* total abandoned and disconnected calls */
int     last_ans = 0;       /* sum of answered calls in ans_bucket */
int     last_aban = 0;      /* sum of abandoned calls in aban_bucket */
int     last_ready = 0;     /* sum of ready time in ready_bucket */
int     i;
struct iss_pgrp_info pgrp_buf;  /* buffer for ISS pgrp statistics */
struct iss_proj_info proj_buf;  /* buffer for ISS proj statistics */ tmerror(CHP, 5, 0, "Entering adjustspeed, cgp_idx = %d", cgp_idx);

/* check if we've made NC calls */
if (cgp->currcalls < NC) {
        return;
}

/* get the project group statistics */
pgrp_buf.cgp_idx = cgp_idx;

if ( (stat=iss_get_pgroup(&pgrp_buf,FIND_UNIT,NO_LOCK_TABLE)) == E_SUCCE
        tot_answered = pgrp_buf.tot_prj_answered;
        tot_ready = pgrp_buf.tot_prj_ready;
        tot_abandisc = pgrp_buf.tot_prj_abandoned +
                       pgrp_buf.tot_prj_disconnect;
}
else {
        if (stat != E_NOT_FOUND) {
                tmerror (CHP, 1, 0, "get proj group stat failed, error c
                return;
        }
}

/* get the project statistics for the project group */
proj_buf.cgp_idx = cgp_idx;

if ( (stat=iss_get_project(&proj_buf,FIND_CGPX,NO_LOCK_TABLE)) == E_SUCC tot_answered += proj_buf.project_answered;
        tot_ready += proj_buf.ready_time;
        tot_abandisc += (proj_buf.project_abandoned +
                        proj_buf.project_disconnect);
}
else {
        if (stat != E_NOT_FOUND) {
                tmerror (CHP, 1, 0, "get proj stat failed, error code =
                return;
        }
} if (stat == E_SUCCESS) {
        if ( (stat=iss_get_project(&proj_buf,FIND_NEXT,NO_LOCK_TABLE)) =
                while (proj_buf.cgp_idx == cgp_idx && stat != E_NOT_FOUN
                        tot_answered += proj_buf.project_answered;
                        tot_ready += proj_buf.ready_time;
                        tot_abandisc += (proj_buf.project_abandoned +
                                        proj_buf.project_disconnect);

stat=iss_get_project(&proj_buf,FIND_NEXT,NO_LOCK
                        if ( stat != E_SUCCESS && stat != E_NOT_FOUND )
                                tmerror (CHP, 1, 0, "get proj stat faile
                                return;
                        }
                }
        }
        else {
                if (stat != E_NOT_FOUND) {
                        tmerror (CHP, 1, 0, "get proj stat failed, error
                        return;
```

```c
        }
    }
} tmerror(CHP, 5, 0, "currcalls = %d ans = %ld abandisc = %d ready = %ld",
if (Trace)
        fprintf(chp_fd, "currcalls = %d ans = %ld ready = %ld abandisc =

/* return if no answered calls */
if (tot_answered == 0)
        return;

/* copy extracted values into callgroup structure */
cgp->ready = tot_ready;
cgp->ans = tot_answered;
cgp->abandoned = tot_abandisc;

/* set answered and abandoned/disc calls and
 * ready time since last checked
 * into the buckets
 */
cgp->ans_bucket[Bucket_ptr[cgp_idx]] = cgp->ans - cgp->prior_answered;
cgp->aban_bucket[Bucket_ptr[cgp_idx]] = cgp->abandoned - cgp->prior_aban
cgp->ready_bucket[Bucket_ptr[cgp_idx]] = cgp->ready - cgp->prior_ready;

/* move the bucket pointer */
if (Bucket_ptr[cgp_idx] == N - 1)
        Bucket_ptr[cgp_idx] = 0;
else
        Bucket_ptr[cgp_idx]++;

/* calculate the answered and abandoned/disc calls
 * and ready time from buckets
 */
for (i = 0; i < N; i++) {
        last_ans += cgp->ans_bucket[i];
        last_aban += cgp->aban_bucket[i];
        last_ready += cgp->ready_bucket[i];
}
tmerror(CHP, 5, 0, "last ans = %d last_aban = %d last_ready = %d", last_
if (Trace)
        fprintf(chp_fd, "last ready = %d last_ans = %d last_aban = %d\n"

/* check if we've reached or passed the max % abandoned calls */
cur_abandans = (int) (((float)last_aban / (float)last_ans) * 1000.0);
tmerror(CHP, 5, 0, "adjustspeed: cur_abandans = %d, cgp->abandans = %d",
        cur_abandans, cgp->abandans);
if (Trace)
        fprintf(chp_fd, "cur_abandans = %d, cgp->abandans = %d\n", cur_a /* slow down if necessary but do not go slower than SLOWSPEED */
if ( cur_abandans >= cgp->abandans) {
        if (speedchgflg[cgp_idx]) {
                speedchg = S1THROTTLE;
                speedchgflg[cgp_idx] = FALSE;
        }
        else
                speedchg = S2THROTTLE;
        cgp->pdspeed += speedchg;
        if (cgp->pdspeed > SLOWSPEED)
                cgp->pdspeed = SLOWSPEED;
        tmerror(CHP, 5, 0, "adjustspeed: slowing down pdspeed = %d", cgp
        if (Trace)
                fprintf(chp_fd, "slowing down pdspeed = %d\n", cgp->pdsp
        cgp->currcalls = 0;
        cgp->prior_ready = cgp->ready;
        cgp->prior_answered = cgp->ans;
        cgp->prior_abandoned = cgp->abandoned;
        return;
}
```

```
        /* get the average wait time between calls */
        if (last_ans == 0)
                calcavg = 0;
        else
                calcavg = last_ready / last_ans;
         * desired wait time, check if current % abandoned calls is
         * close to max.  If so, do not touch speed.  Otherwise
         * speed up dial-ahead.
         */
        tmerror(CHP, 5, 0, "adjustspeed: calcavg = %d, cgp->avewait = %d",
                calcavg, cgp->avewait);
        if (Trace)
                fprintf(chp_fd, "calcavg = %d, cgp->avewait = %d\n", calcavg, cg
        if (calcavg > cgp->avewait) {
                tmerror(CHP, 5, 0, "adjustspeed: current ave waiting > desired")
                if (Trace)
                        fprintf(chp_fd, "current ave waiting > desired\n");
                if (((float)cur_abandans * F) >= (float)cgp->abandans) {
                        cgp->currcalls = 0;
                        cgp->prior_ready = cgp->ready;
                        cgp->prior_answered = cgp->ans;
                        cgp->prior_abandoned = cgp->abandoned;
                        tmerror(CHP, 5, 0, "adjustspeed: close to max abandans")
                        if (Trace)
                                fprintf(chp_fd, "close to max abandans\n");
                        return;
                }
                else {
                        cgp->pdspeed -= FTHROTTLE;
                        speedchgflg[cgp_idx] = TRUE;

/* do not allow speed to be faster than FASTSPEED */
                        if (cgp->pdspeed < FASTSPEED)
                                cgp->pdspeed = FASTSPEED;

tmerror(CHP, 5, 0, "adjustspeed: speeding up pdspeed = %
                        if (Trace)
                                fprintf(chp_fd, "speeding up pdspeed = %d\n", cg
                }
        }
        else {
                /* if calcavg < desired, slow down */
                if ( calcavg < cgp->avewait ) {
                        if (speedchgflg[cgp_idx]) {
                                speedchg = S1THROTTLE;
                                speedchgflg[cgp_idx] = FALSE;
                        }
                        else
                                speedchg = S2THROTTLE;
                        cgp->pdspeed += speedchg;
                        if (cgp->pdspeed > SLOWSPEED)
                                cgp->pdspeed = SLOWSPEED;
                        tmerror(CHP, 5, 0, "adjustspeed: slowing down pdspeed =
                        if (Trace)

fprintf(chp_fd, "slowing down pdspeed = %d\n", c
                }
        }

/* reset counter for calls between checks */
        cgp->currcalls = 0;

/* reset prior ready time and prior calls answered */
        cgp->prior_ready = cgp->ready;
        cgp->prior_answered = cgp->ans;
        cgp->prior_abandoned = cgp->abandoned;
```

Although the invention has been described and illustrated in detail, the same is by way of illustration and example only. The spirit and scope of the invention are to be limited only by the terms of the appended claims.

We claim:

1. A method for providing a continuous sequence of completed telephone calls to a plurality of operators using a telephone system having a switch for dialing calls over a plurality of telephone lines, comprising the steps of:
   (a) dialing a plurality of calls over said telephone lines;
   (b) predicting a number of operators expected to be available to handle a call completion at an end of a predetermined time interval;
   (c) predicting a number of calls expected to be completed during the predetermined time interval;
   (d) processing the predicted number of calls to generate a weighted number of calls expected to be completed during the predetermined time interval;
   (e) determining whether the weighted number of calls is less than the predicted number of operators;
   (f) if the weighted number of calls is less than the predicted number of operators, dialing another call; and
   (g) repeating steps (e)-(f) until the weighted number of calls is equal to the predicted number of operators.

2. The method for providing a continuous sequence of completed telephone calls as described in claim 1 wherein the step of predicting the number of operators includes the steps of:
   counting a number of currently available operators;
   counting a number of currently busy operators;
   processing the number of currently busy operators to generate a weighted number of currently busy operators; and
   adding the number of currently available operators to the weighted number of currently busy operators to generate the predicted number of operators expected to be available to handle a call completion at the end of the predetermined time interval.

3. The method for providing a continuous sequence of completed telephone calls as described in claim 2 wherein the step of processing the number of currently busy operators multiplies the number of currently busy operators by a predetermined number.

4. The method for providing a continuous sequence of completed telephone calls as described in claim 3 wherein the predetermined number is equal to an average probability that a busy operator will complete a call in the predetermined time interval.

5. The method for providing a continuous sequence of completed telephone calls as described in claim 1 wherein the step of predicting the number of calls expected to be completed includes the steps of:
   counting a number of calls currently dialed but not answered or busy;
   generating an historical percentage of calls answered over a time period; and
   multiplying the number of calls currently dialed but not answered or busy by the historical percentage of calls answered to generate the predicted number of calls expected to be completed during the predetermined time interval.

6. The method for providing a continuous sequence of completed telephone calls as described in claim 1 wherein the step of processing the predicted number of calls multiplies the predicted number of calls by a predetermined weighting factor.

7. The method for providing a continuous sequence of completed telephone calls as described in claim 6 further including the steps of:
   (h) determining whether a predetermined number of calls have been dialed; and
   (i) if the predetermined number of calls have been dialed, adjusting the predetermined weighting factor.

8. The method for providing a continuous sequence of completed telephone calls as described in claim 7 wherein the step of adjusting the predetermined weighting factor includes the steps of:
   (j) setting an acceptable percentage of unattended calls;
   (k) calculating a current percentage of unattended calls;
   (l) determining whether the acceptable percentage of unattended calls has been exceeded; and
   (m) if the acceptable percentage of unattended calls has been exceeded, increasing the predetermined weighting factor.

9. The method for providing a continuous sequence of completed telephone calls as described in claim 8 wherein the step of adjusting the predetermined weighting factor further includes the steps of:
   (n) setting an acceptable average idle-time between calls for the operators;
   (o) if the acceptable percentage of unattended calls has not been exceeded, calculating a current average idle-time between calls;
   (p) determining whether the acceptable average idle-time between calls has been exceeded;
   (q) if the acceptable average idle-time between calls has been exceeded, decreasing the predetermined weighting factor; and
   (r) if the acceptable average idle-time between calls has not been exceeded, increasing the predetermined weighting factor.

10. A method for providing a continuous sequence of completed telephone calls to a plurality of operators using a telephone system having a switch for dialing calls over a plurality of telephone lines, comprising the steps of:
    (a) dialing a plurality of calls over said telephone lines;
    (b) predicting a number of operators expected to be available to handle a call completion at an end of a predetermined time interval;
    (c) predicting a number of calls expected to be completed during the predetermined time interval;
    (d) multiplying the predicted number of calls by a predetermined weighting factor to generate a weighted number of calls expected to be completed during the predetermined time interval;
    (e) determining whether a predetermined number of calls have been dialed;
    (f) if the predetermined number of calls have not been dialed, determining whether the weighted number of calls are less than the predicted number of operators;

(g) if the weighted number of calls are less than the predicted number of operators, dialing another call;

(h) repeating steps (f)–(g) until the weighted number of calls are equal to the predicted number of operators; and (i) if the predetermined number of calls have been dialed, adjusting the predetermined weighting factor.

11. The method for providing a continuous sequence of completed telephone calls as described in claim 10 wherein the step of adjusting the predetermined weighting factor includes the steps of:

(j) setting an acceptable percentage of unattended calls;

(k) calculating a current percentage of unattended calls;

(l) determining whether the acceptable percentage of unattended calls has been exceeded; and (m) if the acceptable percentage of unattended calls has been exceeded, increasing the predetermined weighting factor.

12. The method for providing a continuous sequence of completed telephone calls as described in claim 11 wherein the step of adjusting the predetermined weighting factor further includes the steps of:

(n) setting an acceptable average idle-time between calls for the operators;

(o) if the acceptable percentage of unattended calls has not been exceeded, calculating a current average idle-time between calls;

(p) determining whether the acceptable average idle-time between calls has been exceeded;

(q) if the acceptable average idle-time between calls has been exceeded, decreasing the predetermined weighting factor; and (r) if the acceptable average idle-time between calls has not been exceeded, increasing the predetermined weighting factor.

* * * * *